Patented Dec. 15, 1925.

1,566,186

UNITED STATES PATENT OFFICE.

MARIE FARNSWORTH, OF NEW BRUNSWICK, NEW JERSEY.

METHOD FOR MANUFACTURING GYPSUM FROM ANHYDRITE.

No Drawing.   Application filed March 11, 1925.   Serial No. 14,835.

*To all whom it may concern:*

Be it known that I, MARIE FARNSWORTH, citizen of the United States, residing at New Brunswick, in the county of Middlesex and State of New Jersey, have invented certain new and useful Improvements in Methods for Manufacturing Gypsum from Anhydrite, of which the following is a specification.

This invention is a method for manufacturing gypsum from anhydrite.

Anhydrite (anhydrous calcium sulfate) as such, is of very slight use; it is plentiful enough, occurring in gypsum mines and as a by-product in certain industries. But there is practically no commercial use for it. If, however, the anhydrite can be hydrated to gypsum, $CaSO_4.2H_2O$ commercially, for which there is a very wide use, as in making plaster of Paris, gypsum board and the like, and as a retarder in Portland cement, a product that is now almost valueless, may be recovered and used commercially.

It is known that anhydrite will go over into gypsum if in contact with water. But this under ordinary conditions, is such a slow change that any recovery of anhydrite in this manner is useless industrially. For example, Gill, Jour. Amer. Gramics Soc. 1, 65–71, 1918 says that in a sample of anhydrite that stood in contact with water for six years, about one-third of it was hydrated. J. L. McCaleb, Amer. Chem. Jour. 11, 34, (1889) took anhydrite in the form of a fine powder and observed the rate of hydration over a period of thirty-six weeks. From his experiments, he concludes the hydration would be complete in about two years.

Applicant finds that as the anhydrite is ground finer and finer, the rate of hydration is slowly increased. Applicant has discovered, however, that a most unusual and unexpected increase in the rate of hydration takes place when the grinding was carried to a stage where the particles varied in size from 135 microns down to the colloidal with an average size of about 18 microns. The curve showing the rate of hydration took a sudden and sharp upward bend when the grinding was carried to this stage showing a sudden and sharp increase in the rate of hydration. As the grinding was carried finer and finer, the rate of hydration increased out of all proportion to the fineness of the grinding.

More specifically, applicant has found that where the particles vary in size from 3 mm. down to about $\frac{1}{10}$ of a millimeter, the hydration that takes place in three weeks slowly increases from a fraction of one per cent up to about five or six per cent, a rate that commercially and industrially is useless, and that would require from fifty weeks to some years for the completion of the hydration. When, however, the grinding was carried to a stage where the particles varied from 30 microns in size, down to the colloidal, with an average particle size of 7 microns, the sample was completely hydrated in three weeks. With an average particle size of 8 microns, the sample was 33% hydrated in three weeks. With an average particle size of 9 microns, the sample was 33% hydrated in three weeks. These and other results are tabulated below.

The rate of hydration and the time for complete hydration, as related to the size of the particles, is indicated in this tabulation:—

| Approximate maximum size in microns | Approximate minimum size | Average particle size in microns | Time for complete hydration | Per cent hydrated to gypsum in three weeks |
|---|---|---|---|---|
| | | | Weeks | |
| 135 | Colloidal | 18 | 18 | 14 |
| 90 | " | 12 | 13 | 23 |
| 75 | " | 10 | 11 | 27 |
| 45 | " | 9 | 9 | 33 |
| 35 | " | 8 | 4 | 75 |
| 30 | " | 7 | 3 | 100 |

The grinding may be carried out in any desired type of mill, such for example, as a ball, pebble or colloid mill. The grinding may be, and preferably is, a wet grinding, but may be dry or wet or partly dry and partly wet. The invention is not to be limited to grinding in any particular type of mill, or to a grinding which is wet or dry or both. These details may be varied within the scope of the invention.

After the material is ground to the required fineness, it is hydrated by mixing with an excess of water, and preferably agitated from time to time, or continuously. Agitation increases the rate of hydration. Steam may be used if desired. The details of this hydrating step may be varied within the scope of the invention.

I claim as my invention:—

1. A method for forming gypsum from anhydrite which comprises grinding anhydrite to a size between the limits in which the largest particles do not exceed substantially 135 microns with an average size of 18 microns to that in which the largest particles do not exceed substantially 30 microns with an average size of substantially 7 microns and hydrating the ground anhydrite.

2. A method for forming gypsum from anhydrite which comprises grinding anhydrite to an average fineness of substantially 7 to 9 microns and hydrating the ground material.

3. A method for forming gypsum from anhydrite which comprises grinding anhydrite to an average fineness of substantially 7 microns, in which the largest particles do not exceed substantially 30 microns, and mixing the resulting material with water to hydrate the anhydrite.

In testimony whereof I affix my signature.

MARIE FARNSWORTH.